United States Patent
Jonsky

(10) Patent No.: US 11,527,974 B2
(45) Date of Patent: Dec. 13, 2022

(54) METHOD FOR DETERMINING CURRENT-DEPENDENT INDUCTANCES OF A MULTI-PHASE ELECTRICAL MACHINE AND FREQUENCY CONVERTER

(71) Applicant: Lenze SE (Societas Europaea), Aerzen (DE)

(72) Inventor: Torben Jonsky, Hannover (DE)

(73) Assignee: Lenze SE (Societas Europaea), Aerzen (DE)

(*) Notice: Subject to any disclaimer, the term of this patent is extended or adjusted under 35 U.S.C. 154(b) by 9 days.

(21) Appl. No.: 17/153,111

(22) Filed: Jan. 20, 2021

(65) Prior Publication Data

US 2021/0226565 A1 Jul. 22, 2021

(30) Foreign Application Priority Data

Jan. 20, 2020 (DE) ...................... 10 2020 200 597.4

(51) Int. Cl.
| | |
|---|---|
| H02P 6/12 | (2006.01) |
| H02P 6/185 | (2016.01) |
| H02P 21/18 | (2016.01) |
| H02P 21/00 | (2016.01) |
| H02P 23/14 | (2006.01) |

(52) U.S. Cl.
CPC .......... H02P 6/185 (2013.01); H02P 21/0025 (2013.01); H02P 21/18 (2016.02); H02P 23/14 (2013.01)

(58) Field of Classification Search
CPC ...... H02P 6/185; H02P 21/18; H02P 21/0025; H02P 23/14; H02P 25/22; H02P 27/08; H02P 27/16; H02P 21/14

See application file for complete search history.

(56) References Cited

U.S. PATENT DOCUMENTS

| | | | |
|---|---|---|---|
| 2004/0189241 A1* | 9/2004 | Eisenhardt | H02P 6/153 318/716 |
| 2018/0198391 A1 | 7/2018 | Stichweh et al. | |
| 2019/0222156 A1 | 7/2019 | Trolle et al. | |

FOREIGN PATENT DOCUMENTS

| | | |
|---|---|---|
| DE | 11 2016 006 552 T5 | 12/2018 |
| WO | WO 2016/207383 A1 | 12/2016 |

OTHER PUBLICATIONS

Decker et al., "Online Parameter Identification of Permanent Magnet Synchronous Machines with Nonlinear Magnetics based on the Inverter Induced Current Slopes and the dq-System Equations" 2019 21st European Conference on Power Electronics and Applications (EPE '19 ECCE Europe), Genova, Italy, 2019, pp. P.1-P.10 (10 pages).

* cited by examiner

*Primary Examiner* — Karen Masih
(74) *Attorney, Agent, or Firm* — Crowell & Moring LLP

(57) ABSTRACT

A method ascertains current-dependent inductances of a polyphase electrical machine. The method generates phase voltages for the polyphase electrical machine by means of a pulse width modulation such that currents of predefined current level flow through stator windings of the electrical machine. During a number of cycles of the pulse width modulation, the method generates a voltage pulse such that a change of current is brought about in a torque-forming axis of the polyphase electrical machine and/or in a field-forming axis of the polyphase electrical machine. The method measures the change of current, and ascertains the current-dependent inductances on the basis of the change of current.

9 Claims, 4 Drawing Sheets

METHOD FOR DETERMINING CURRENT-DEPENDENT INDUCTANCES OF A MULTI-PHASE ELECTRICAL MACHINE AND FREQUENCY CONVERTER

BACKGROUND AND SUMMARY OF THE INVENTION

The invention concerns a method for ascertaining current-dependent inductances of a polyphase electrical machine and a frequency converter.

The invention is based on the object of providing a method for ascertaining current-dependent inductances of a polyphase electrical machine and a frequency converter that are able to be used to reliably ascertain the current-dependent inductances.

The method according to the invention is used for ascertaining current-dependent inductances, in particular differential inductances, of a polyphase electrical machine.

The method according to the invention has the following steps.

A step a), namely generating phase voltages for the polyphase electrical machine by means of a pulse width modulation such that currents of predefined current level flow through stator windings of the electrical machine. This step is sufficiently well known from the prior art, and therefore reference should be made to the relevant specialist literature in this respect.

A step b), namely during or within a number of cycles of the pulse width modulation, generating a voltage pulse such that a change of current is brought about in a torque-forming axis of the polyphase electrical machine and/or in a field-forming axis of the polyphase electrical machine. For the fundamental generation of changes of current in the torque-forming axis of the polyphase electrical machine and/or in the field-forming axis of the polyphase electrical machine, reference should be made to the relevant specialist literature, in particular in respect of frequency converters with vector control.

A step c), namely measuring the change of current produced.

And finally a step d), namely ascertaining the current-dependent inductances on the basis of the change of current.

According to one embodiment, steps a) to d) are repeated a number of times, for example repeated 32 times, with the predefined current level being altered before the or each repetition of step a). It goes without saying that both positive and negative current levels are selectable as operating point. In other words, current-dependent inductances are ascertained for different operating points or current levels.

According to one embodiment, the number of cycles of the pulse width modulation is one.

According to one embodiment, a single voltage pulse is generated during or within a single cycle of the pulse width modulation. In other words, a single voltage pulse is generated during or within a single cycle of the pulse width modulation such that the change of current is brought about in the torque-forming axis of the polyphase electrical machine and/or in the field-forming axis of the polyphase electrical machine. The change of current produced is then measured and the current-dependent inductances are calculated on the basis of the measured change of current.

According to one embodiment, the machine is a three-phase electrical machine, in particular a three-phase synchronous machine.

According to one embodiment, a rotor of the electrical machine is blocked before step a).

According to one embodiment, the current-dependent inductances are selected from the set comprising: differential series inductances, differential parallel inductances, cross-saturation.

The frequency converter according to the invention is designed for controlling a polyphase electrical machine, wherein the frequency converter has three half-bridges, each having at least two switching means, wherein the frequency converter is designed to carry out a method according to one of the preceding claims.

The differential inductances in an electrical machine are dependent on the present operating point, for example on an instantaneous current level. These inductances are used for different control calculations, such as a current controller gain and a voltage feedforward control in a frequency converter.

The differential inductances are conventionally corrected for example using a previously stipulated characteristic curve stored by the motor, for example in a static motor table, on the basis of type. In this respect the characteristic curve is measured and stored for example offline, i.e. not during the actual operation of the electrical machine.

The invention provides a method for identifying this characteristic curve during operation.

According to the invention, a current is impressed into the d- or q-axis of an electrical machine, in particular a synchronous machine, and varied. Following the adjustment of the operating cycle, a voltage pulse in the d- or q-axis is provided for a PWM cycle or a PWM period and the current rise within the cycle or period is measured.

For the voltage $u_d$ in the d-direction, the following applies for example:

$$u_d = R \cdot i_d + L_{dd} \cdot \frac{di_d}{dt} + L_{dq} \cdot \frac{di_q}{dt} - \omega_{el} \cdot \psi_q$$

where R denotes a stator resistance, $i_d$ denotes a current in the d-direction, $L_{dd}$ denotes a differential series inductance, $L_{qq}$ denotes a differential parallel inductance, $\omega_{el}$ denotes an angular velocity of the rotating field and $\psi_q$ denotes a flow in the q-direction. Otherwise, reference should also be made to the relevant specialist literature.

For a firmly braked motor, the result for the current rise in a single PWM cycle if exclusively the d-component is excited with a voltage step change is as follows:

$$\Delta i_d = \frac{L_{dd}}{\Delta u_d} + 0.5 \cdot R \cdot \Delta i_d$$

The voltage difference $\Delta u_d$ in this instance can be measured or can be calculated from setpoint voltages, optionally by using a current-dependent voltage difference between the setpoint and actual voltages (compensation for the inverter error). The voltage drop across the resistor R can optionally be ignored.

Following completion of the measurement for one operating point a further operating point is approached, so that for example a staircase function is obtained. On each step of the staircase a voltage pulse can be output again in order to determine the differential inductance.

The identified inductance can be used for example to directly correct a current controller. In addition, the level of the voltage pulse can likewise be adapted thereby. Identification in the d-axis is always possible; identification in the q-direction is typically possible only if the rotor is firmly braked, since otherwise a movement could occur.

According to the invention, in contrast to the prior art, for example in the case of WO 2016/207383 A1, only a single voltage pulse is impressed in one PWM period for a current operating point instead of injecting high-frequency sinusoidal signals.

The invention allows for example reliable and accurate ascertainment of a saturation characteristic curve of the electrical machines, even if the properties of the latter are not known in advance.

The invention is described in detail below with reference to the drawings.

DETAILED DESCRIPTION OF THE DRAWINGS

Figure 1:
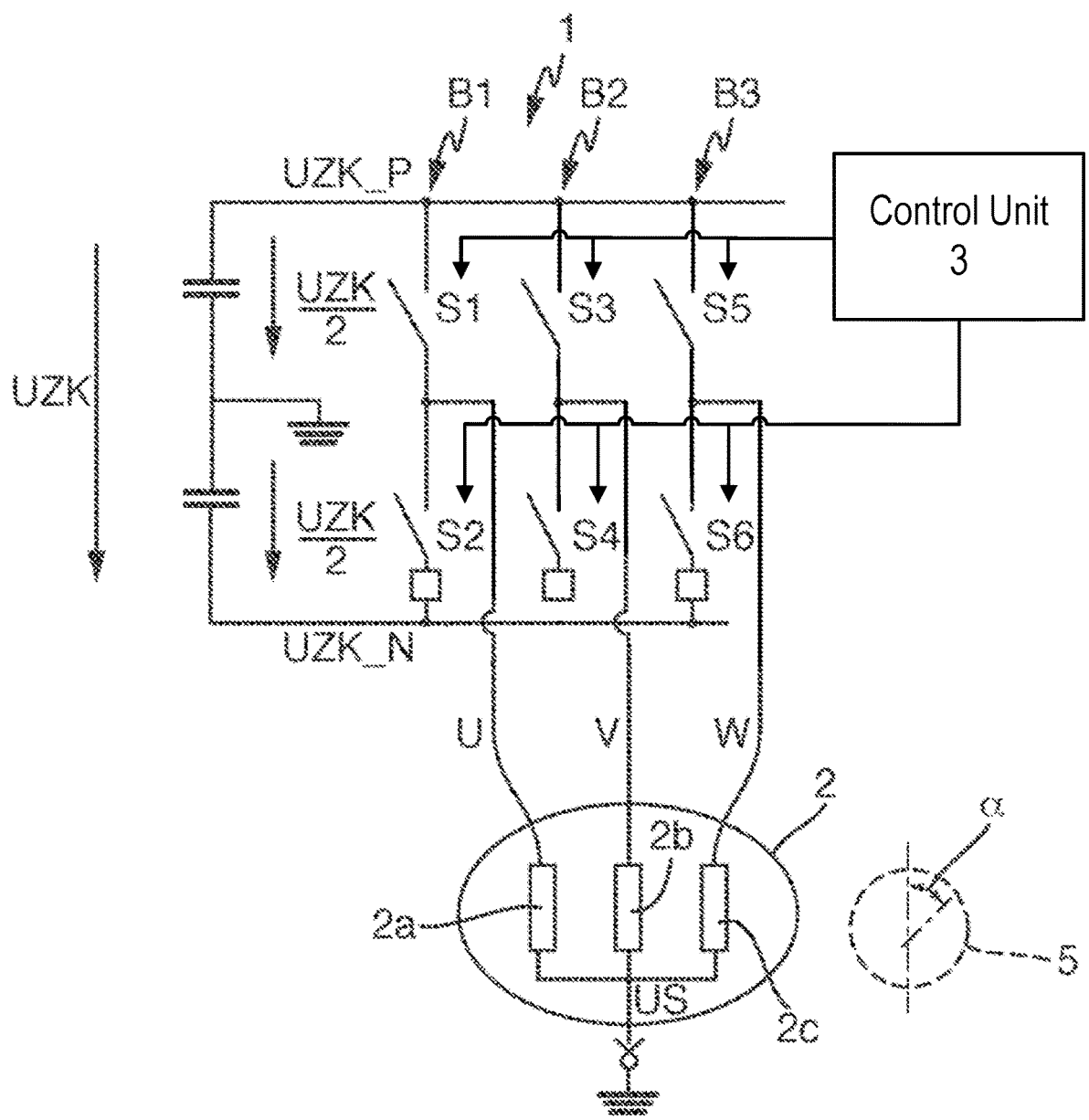
FIG. 1 shows a frequency converter designed for performing the method according to the invention.

FIG. 1 shows a frequency converter 1 designed for controlling a three-phase electrical machine 2 in the form of a synchronous motor, wherein the frequency converter 1 conventionally has three half-bridges B1, B2, B3, each having two semiconductor switching means S1, S2; S3, S4; S5, S6. The switching means S1, S2; S3, S4; S5, S6 are controlled by a control unit 3 of the frequency converter 1.

According to the invention, phase voltages U, V, W for the three-phase electrical machine 2 are generated by means of a conventional pulse width modulation such that currents of predefined current level flow through stator windings 2a, 2b, 2c of the three-phase electrical machine 2, or that a predefined or desired current is produced in the d-direction or q-direction in an iq coordinate system.

Figure 2:
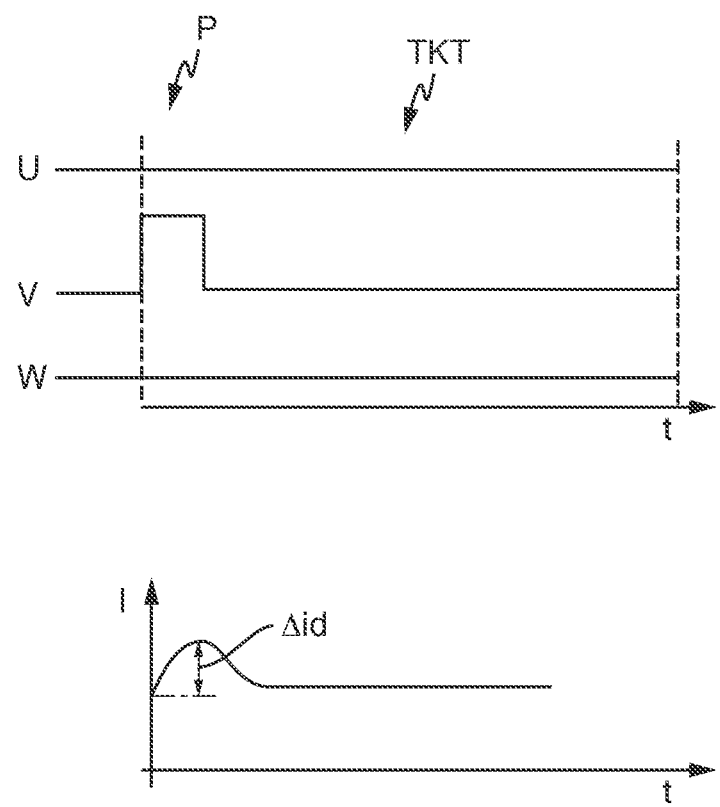
FIG. 2 shows a time characteristic for signals within one cycle of a pulse width modulation performed by means of the frequency converter from FIG. 1, and FIG. 3a/b show a time characteristic for different operating points and inductances ascertained at the operating points.

Referring to FIG. 2, a single voltage pulse P is generated by virtue of a change of switching state for the phase V, while the switching states of the phases U and W are constant, during or within a single cycle or a single period TKT of the pulse width modulation such that a change of current $\Delta id$ is brought about in a torque-forming axis (q-axis) of the polyphase electrical machine 2 and/or in a field-forming axis (d-axis) of the polyphase electrical machine 2.

The changes of current $\Delta id$ and $\Delta idq$ brought about by the voltage pulse P are subsequently measured and this is taken as a basis for calculating current-dependent differential inductance(s), such as for example the series inductances Ldd and/or the parallel inductances Lqq. For the fundamental calculation specifications required for this purpose, reference should also be made to the relevant specialist literature.

A rotor 5 of the electrical machine 2 can be blocked for performing the method.

Figure 3A:
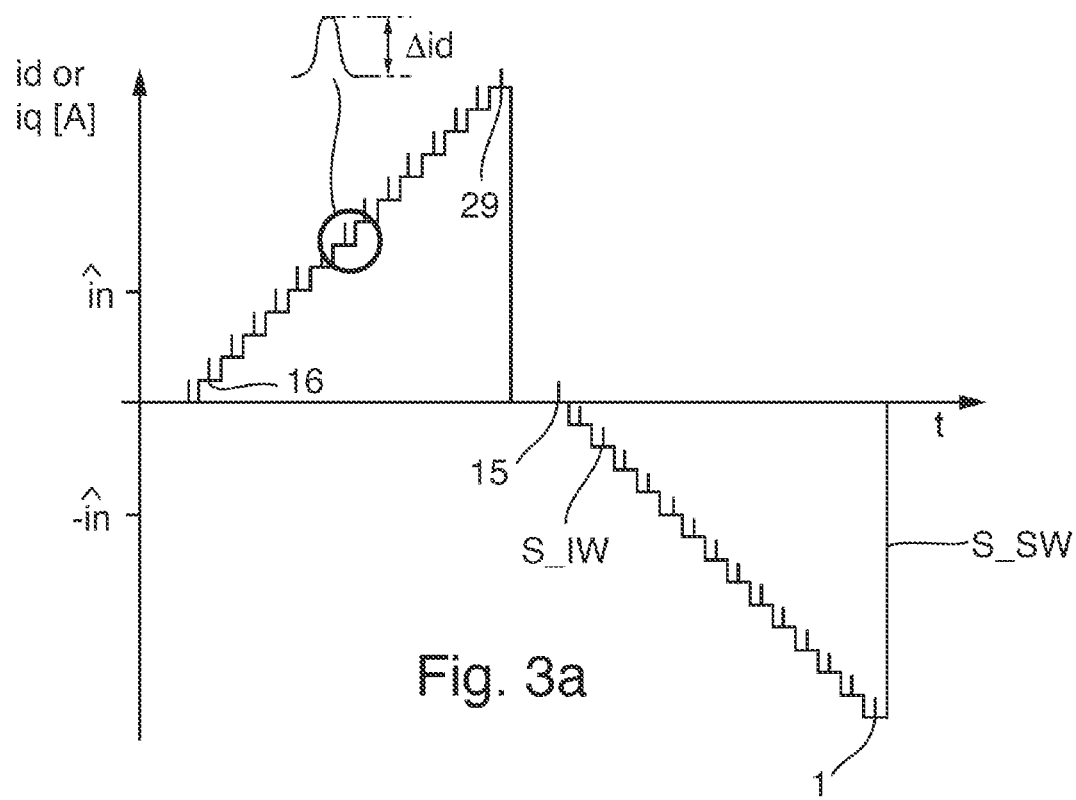

Referring to FIG. 3a/b, there follows a description of how the method steps described above are repeated for a plurality of different current operating points 1 to 29.

FIG. 3a depicts a time characteristic for a current setpoint value S_SW and an arising current actual value S_IW in the d-direction or q-direction of a dq coordinate system. The current setpoint value S_SW exhibits a staircase-shaped characteristic, one of the operating points 1 to 29 having precisely one associated current setpoint value S_SW.

A voltage pulse P is output for each of the operating points 1 to 29 in order to determine the differential series inductance Ldd and/or the differential parallel inductance Lqq at this operating point.

The voltage pulse brings about an operating-point-dependent change of current $\Delta id$ that is used for calculating the differential series inductance Ldd and/or the differential parallel inductance Lqq at this operating point.

Figure 3B:
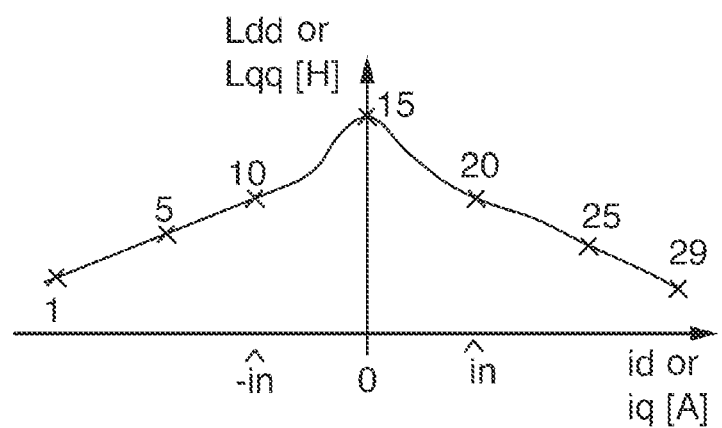
Figure 4:
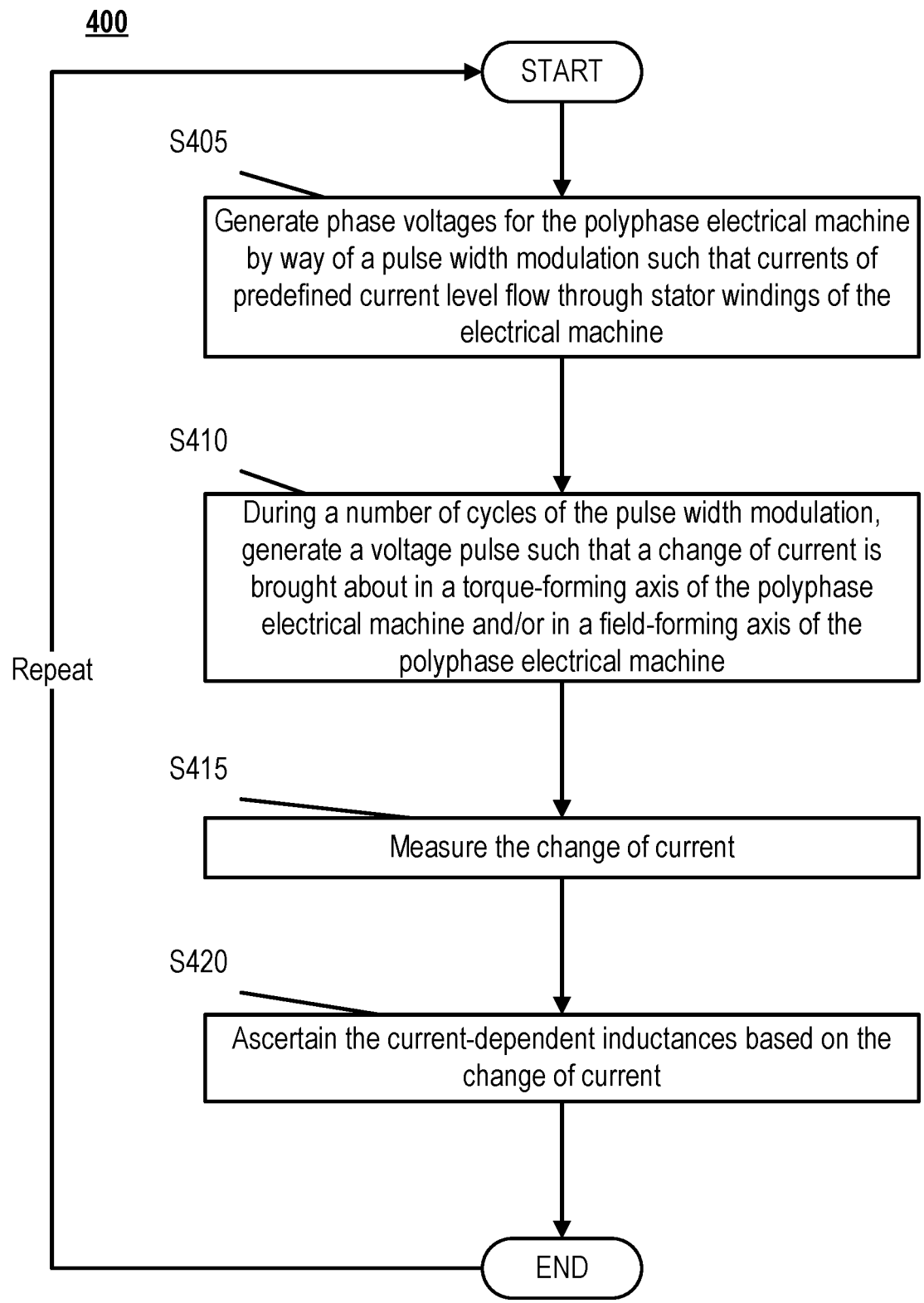
FIG. 4 shows a flowchart of an example method.

FIG. 3b shows the differential series inductances Ldd and differential parallel inductances Lqq calculated at the current-dependent operating points 1 to 29.

The invention allows simple and reliable identification of the differential inductances, in particular the differential series inductances Ldd and/or the differential parallel inductances Lqq, by means of a single voltage pulse for one cycle of the PWM at different current operating points in a short time.

The method 400 according to the invention has the following steps.

In step S405: generating phase voltages for the polyphase electrical machine by means of a pulse width modulation such that currents of predefined current level flow through stator windings of the electrical machine.

In step S410: during or within a number of cycles of the pulse width modulation, generating a voltage pulse such that a change of current is brought about in a torque-forming axis of the polyphase electrical machine and/or in a field-forming axis of the polyphase electrical machine.

In step S415: measuring the change of current produced.

And finally in Step S420: ascertaining the current-dependent inductances based on the change of current.

The invention claimed is:

1. A method for ascertaining current-dependent inductances of a polyphase electrical machine, the method comprising the steps of:
   a) generating phase voltages for the polyphase electrical machine by way of a pulse width modulation such that currents of predefined current level flow through stator windings of the electrical machine;
   b) during a number of cycles of the pulse width modulation, generating a voltage pulse such that a change of current is brought about in a torque-forming axis of the polyphase electrical machine and/or in a field-forming axis of the polyphase electrical machine;
   c) measuring the change of current; and
   d) ascertaining the current-dependent inductances based on the change of current.

2. The method according to claim 1, wherein
   steps a) to d) are repeated a number of times, the predefined current level being altered before step a) is repeated.

3. The method according to claim 1, wherein
   the number of cycles of the pulse width modulation is one.

4. The method according to claim 1, wherein
   a single voltage pulse is generated during a single cycle of the pulse width modulation.

5. The method according to claim 1, wherein
   the machine is a three-phase electrical machine.

6. The method according to claim 1, wherein
   the machine is a three-phase synchronous machine.

7. The method according to claim 1, wherein
   a rotor of the electrical machine is blocked before step a).

8. The method according to claim 1, wherein the current-dependent inductances are selected from:

differential series inductances,
differential parallel inductances, or
cross-saturation.

9. A frequency converter designed for controlling a polyphase electrical machine, wherein the frequency converter comprises:

three half-bridges, each having at least two switches, wherein
the frequency converter is designed to carry out the acts of:
a) generating phase voltages for the polyphase electrical machine by way of a pulse width modulation such that currents of predefined current level flow through stator windings of the electrical machine;
b) during a number of cycles of the pulse width modulation, generating a voltage pulse such that a change of current is brought about in a torque-forming axis of the polyphase electrical machine and/or in a field-forming axis of the polyphase electrical machine;
c) measuring the change of current; and
d) ascertaining the current-dependent inductances based on the change of current.

* * * * *